United States Patent
Das

(10) Patent No.: US 8,677,189 B2
(45) Date of Patent: Mar. 18, 2014

(54) RECOVERING FROM STACK CORRUPTION FAULTS IN EMBEDDED SOFTWARE SYSTEMS

(75) Inventor: Dipankar Das, Pune (IN)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 13/297,822

(22) Filed: Nov. 16, 2011

(65) Prior Publication Data
US 2013/0124917 A1 May 16, 2013

(51) Int. Cl.
*G06F 11/00* (2006.01)
(52) U.S. Cl.
USPC .......................................... 714/38.1; 714/15
(58) Field of Classification Search
USPC ..................................... 714/15, 16, 6.12, 38.1
See application file for complete search history.

(56) References Cited

U.S. PATENT DOCUMENTS

| | | | | |
|---|---|---|---|---|
| 5,668,999 | A * | 9/1997 | Gosling | 717/126 |
| 5,751,985 | A * | 5/1998 | Shen et al. | 712/218 |
| 7,272,748 | B1 * | 9/2007 | Conover et al. | 714/20 |
| 7,380,245 | B1 * | 5/2008 | Lovette | 718/100 |
| 2002/0035676 | A1 * | 3/2002 | Weeks | 711/170 |
| 2002/0099932 | A1 * | 7/2002 | Muro, Jr. | 712/228 |
| 2008/0034169 | A1 * | 2/2008 | Trask et al. | 711/154 |
| 2008/0201604 | A1 * | 8/2008 | Mall et al. | 714/6 |
| 2008/0270831 | A1 * | 10/2008 | Niwa | 714/15 |

* cited by examiner

*Primary Examiner* — Yolanda L Wilson
(74) *Attorney, Agent, or Firm* — John A. Miller; Miller IP Group, PLC

(57) ABSTRACT

A method and system for recovering from stack-overflow or stack-underflow faults without restarting software or hardware. At every task switch operation in an application program, a portion of the memory stack is copied to a backup location, so that portion of the stack can be restored if it is subsequently corrupted by a stack-overflow or stack-underflow fault during the execution of the next task. State variable data is similarly copied to a backup location, so that it can be used to restore or estimate the output of the next task if that task experiences a fault. Techniques are disclosed for selecting which state variable data and which portion of the memory stack to copy to backup, and for detecting a stack-overflow or stack-underflow fault and restoring state variable and memory data in the event of such a fault.

20 Claims, 4 Drawing Sheets

RECOVERING FROM STACK CORRUPTION FAULTS IN EMBEDDED SOFTWARE SYSTEMS

BACKGROUND OF THE INVENTION

1. Field of the Invention

This invention relates generally to software fault recovery and, more particularly, to a method for recovering from a stack-overflow and stack-underflow fault in a software system which restores corrupted memory regions, terminates the faulty or corrupted task, and estimates the output and next state of the faulty or corrupted task.

2. Discussion of the Related Art

Modern vehicles feature automatic systems which control many aspects of the vehicles' performance. These systems use software which is becoming increasingly sophisticated and complex, with some vehicles containing systems which include tens of millions of lines of code. Given the complexity of the software, the short time for an automotive manufacturer to bring a vehicle to market, and the wide range of conditions in which a vehicle can be operated, there are bound to be occasional faults experienced by the software.

A common type of fault is the stack-overflow or stack-underflow (collectively, "stack-overflow/underflow" or "stack corruption") fault. In a stack-overflow/underflow fault, a program attempts to write data to a portion of a memory stack outside the prescribed range—either above the origin of the stack (underflow) or beyond the maximum extent of the stack (overflow). Stack-overflow/underflow faults usually result in a corruption of some system data and/or some portion of stack memory. Although detection techniques for stack-overflow/underflow faults are well known, recovery techniques have been unsatisfactory. In typical software systems, the response to a stack-overflow/underflow fault is to either restart all software programs or restart the processor hardware itself. Because many embedded automotive systems run in real time, they cannot afford to be inoperative for the relatively long time it takes for a hardware or software restart.

There is a need for a stack-overflow/underflow fault recovery technique which does not require a hardware or software restart, yet which is efficient enough in terms of memory and processor usage to be viable in the highly resource-constrained automotive environment.

SUMMARY OF THE INVENTION

In accordance with the teachings of the present invention, a method and system are disclosed for recovering from stack-overflow/underflow faults without restarting software or hardware. At every task switch operation in an application program, a portion of the memory stack is copied to a backup location, so that portion of the stack can be restored if it is subsequently corrupted by a stack-overflow or stack-underflow fault during the execution of the next task. State variable data is similarly copied to a backup location, so that it can be used to restore or estimate the output of the next task if that task experiences a fault. Techniques are disclosed for selecting which state variable data and which portion of the memory stack to copy to backup, and for detecting a stack-overflow/underflow fault and restoring state variable and memory data in the event of such a fault.

Additional features of the present invention will become apparent from the following description and appended claims, taken in conjunction with the accompanying drawings.

DETAILED DESCRIPTION OF THE EMBODIMENTS

Figure 1:
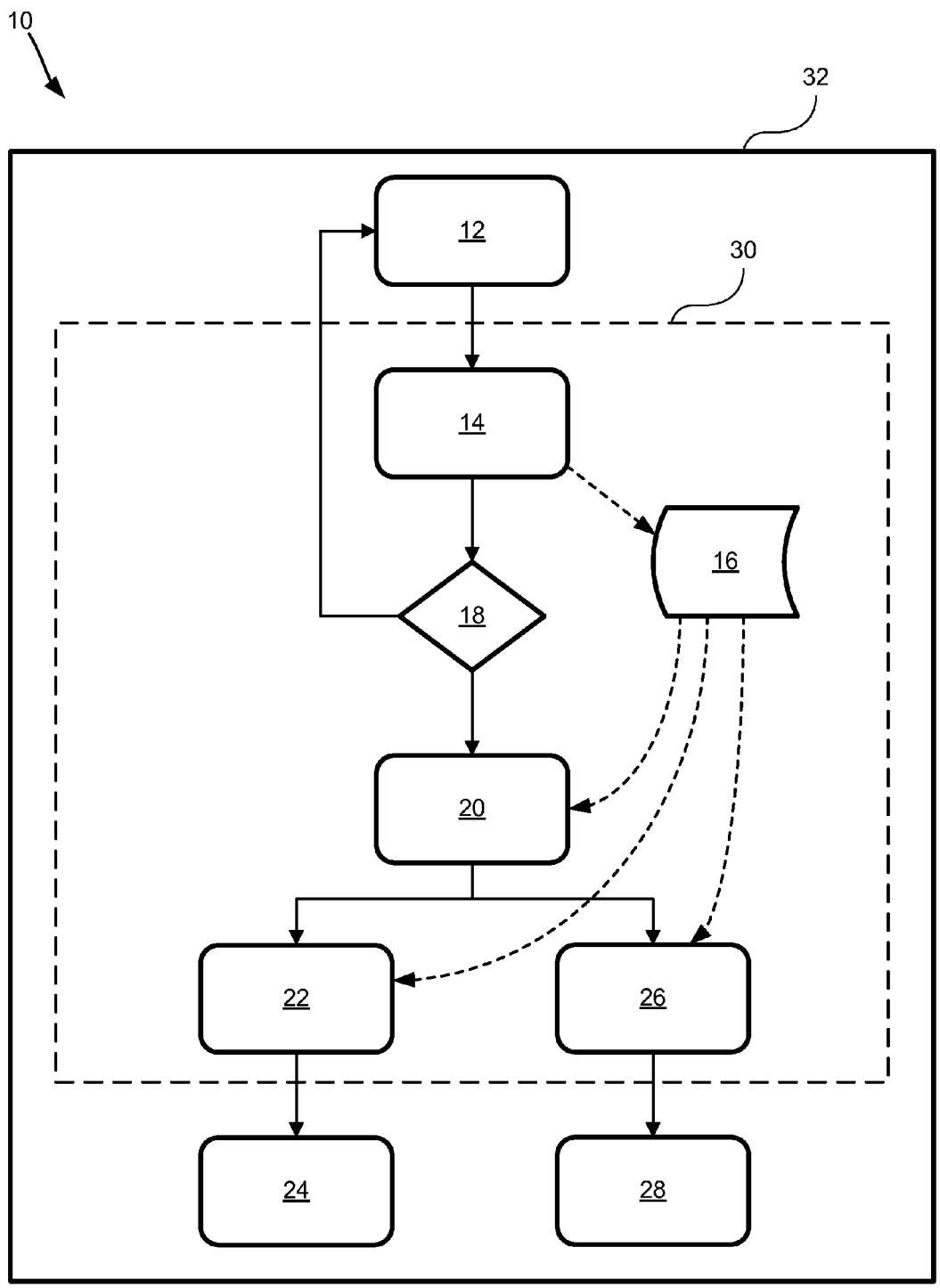
FIG. 1 is a block diagram of a system capable of recovering from a stack corruption without restarting software or hardware.

The following discussion of the embodiments of the invention directed to recovering from stack-overflow/underflow faults in embedded software systems is merely exemplary in nature, and is in no way intended to limit the invention or its applications or uses. In particular, much of the following discussion revolves around automotive real-time control systems, but the disclosed methods and systems are equally applicable to any other type of software system which could benefit from stack corruption recovery.

In software systems, a stack overflow or underflow occurs when a program writes to a memory address on the program's call stack outside of the intended data structure, which is usually a fixed length buffer. Stack overflows happen when too much data (from frames of functions, interrupts or traps) is pushed onto the stack. Stack underflows happen when there is an overflow of a local buffer. Stack overflows and underflows can be caused by software bugs, or by malicious attacks by hackers. In either case, stack overflows and underflows almost always result in corruption of adjacent data on the stack, and if not detected, will often cause the program to crash or operate incorrectly. Thus, there is a strong incentive to detect and address stack corruptions before they cause further problems.

It is a common software design technique to check for stack overflows and underflows during program execution. One method for detecting stack overflows is through the use of stack canaries. Stack canaries, so named because they operate as a canary in a coal mine to provide an early indication of a problem, are used to detect a stack corruption before further faulty code execution can occur. This method works by placing a known data value, which is randomly chosen at program start, in memory just before the stack return pointer. By definition, a stack overflow/underflow means data has been written outside of the prescribed address range, so if a stack corruption occurs, the canary value will be overwritten. The canary value is checked to make sure it has not changed before a routine uses the return pointer on the stack. If the canary has a value other than what is expected, then a stack underflow has likely occurred. A similar technique can be used to detect stack overflows. Stack canaries can be checked at function-call returns, as described above, or at other less-frequent occurrences, such as task switches.

When a stack overflow or underflow is detected, by checking canary values or by other means, most programs typically report the overflow/underflow condition, then terminate all application programs and/or restart the processor. However, many embedded automotive software systems operate in real time, and cannot afford to be inoperative for the period of time it takes to perform a restart of software programs or the processor. Such systems would benefit from a methodology which can detect and recover from most stack overflows and underflows without having to restart the programs or the processor.

FIG. 1 is a block diagram of a system 10 capable of recovering from a stack-overflow/underflow without restarting software or hardware. Block 12 is an application program which is running on a processor 32, along with all other elements of the system 10. The processor 32 can be a microcontroller for an embedded control system application, or a more general purpose microprocessor or electronic control unit. Whenever a task completes in the application program at the block 12, control is transferred to block 14, where system state data and memory data are captured and stored in data store 16. The data store 16 stores a checkpoint of certain state variables, and stores a backup copy of certain portions of system memory—in both the direction of stack overflow and stack underflow for a task's stack—as will be discussed in detail below. The state data capture at the block 14 can be invoked not only between execution of two tasks, but also between a task and an interrupt service routine, or between an interrupt service routine and a task.

At diamond 18, a stack-overflow or stack-underflow condition is checked for, either by checking canary values or by another suitable method. If no stack overflow or underflow is detected at the diamond 18, control returns to the program at the block 12 and the program continues running. If a stack overflow or underflow is detected at the diamond 18, then at block 20 the faulty task and the corrupted memory region are identified. The faulty task is known to be the task which was executing prior to control was transferred to the block 14. The corrupted memory region is dependent on the task which caused the stack overflow or underflow, as the corrupted region is the one adjoining the stack which overflows in the direction of stack growth, or underflows past the stack origin, as will be shown in a later figure. Once the corrupted memory region is identified at the block 20, it can be restored at block 22 by overwriting it with a fixed-size block of memory which was copied to a safe location in the data store 16 prior to invocation of the faulty task. Block 24 is the repaired software system containing the restored block of memory.

If, during restoration of the corrupted memory region at the block 22, it is determined that important call stack data is overwritten for the task which caused stack corruption, then at block 26 the faulty task is terminated and its output and next state are restored or estimated. The next application output and state can be estimated from the application state prior to invocation of the faulty task, which is available from the data store 16. Block 28 contains the restored or estimated output and next state for the repaired step. Operations inside box 30 are performed at each task switch in the application program at the block 12, and will be discussed in more detail below.

The system 10 can also be used to detect and recover from stack overflows or underflows at function calls, instead of at task switches. In this case, the control would be transferred to the block 14 upon a function call. The remainder of the system 10 would be unchanged from the description above; a state data backup would be captured in the data store 16 before function execution, a stack-overflow/underflow condition would be checked for at the diamond 18 after function execution, and recovery from the stack-overflow/underflow condition would be carried out at the blocks 20-28.

Figure 2B:
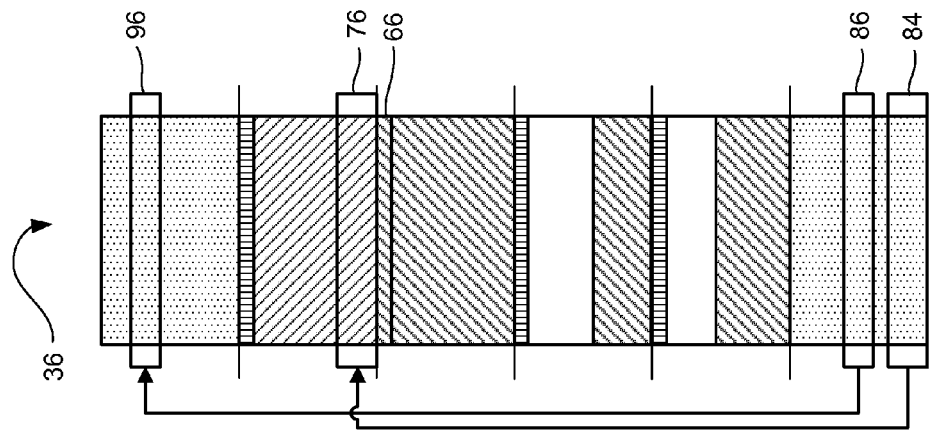
FIG. 2B is a diagram of the memory stack from FIG. 2, illustrating recovery from a stack-overflow fault at a task switch.
Figure 2A:
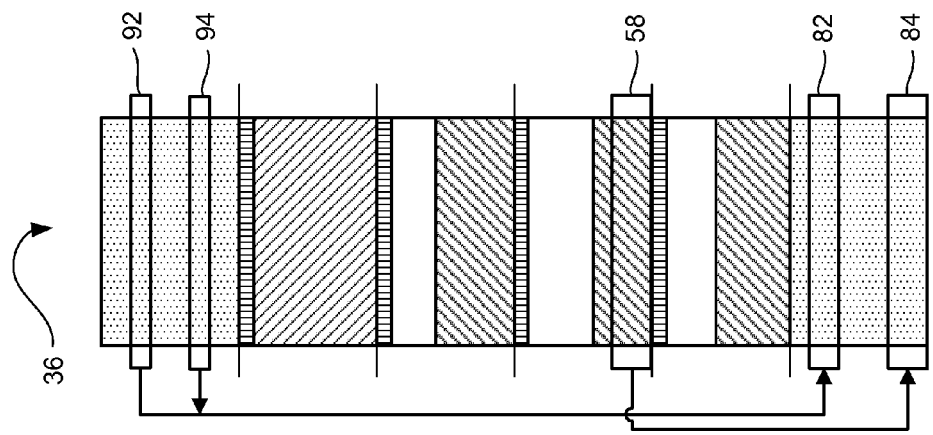
FIG. 2A is a diagram of the memory stack from FIG. 2, illustrating fault-free behavior at a task switch.
Figure 2:
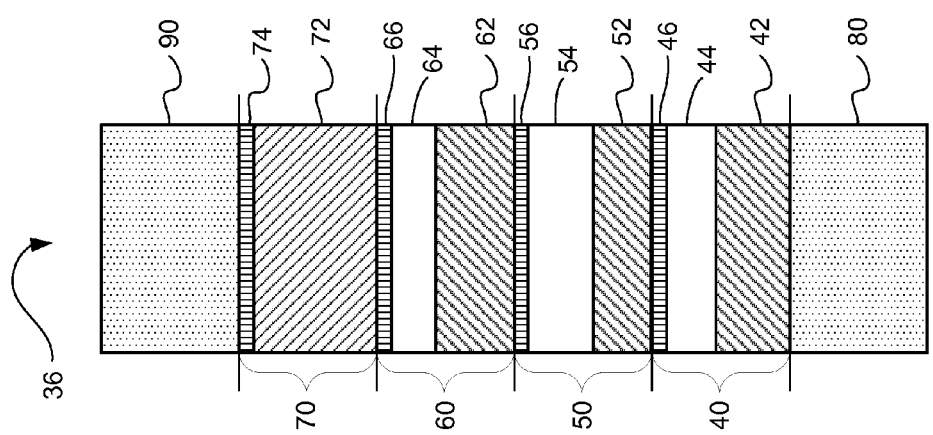
FIG. 2 is a diagram of a memory stack, showing the parts of the stack used for three tasks in an execution cycle.

FIG. 2 is a diagram of a memory space 36 showing the elements used for three tasks in an execution cycle of a program. Stack segment 40 contains stack data for a Task 0, and consists of an occupied Task 0 stack 42, an unoccupied Task 0 stack 44, and a Task 0 canary 46. As illustrated here, the stack segment 40 is a fixed-size space writing "from the bottom up", the stack data currently being stored in occupied Task 0 stack 42 consumes some of this space, the Task 0 canary 46 consumes a small amount of space at the top of the segment 40, and the remainder of the space in the stack segment 40 is the unoccupied Task 0 stack 44. The structure of the stack segment 40 is replicated for a Task 1 stack segment 50, which consists of an occupied Task 1 stack 52, an unoccupied Task 1 stack 54, and a Task 1 canary 56. The structure is further replicated for a Task 2 stack segment 60, which consists of an occupied Task 2 stack 62, an unoccupied Task 2 stack 64, and a Task 2 canary 66. The memory space 36 also includes an operating system (O/S) stack segment 70, consisting of an O/S stack 72 and an O/S canary 74.

Backup memory space 80 is a random access storage area used to store backup copies of memory from higher in the space 36, and also to store state variable checkpoint data. The backup memory space 80 represents the storage location for the data store 16 shown in FIG. 1. The operation of the backup memory space 80 will be explained further in the discussion of FIGS. 2A and 2B below. Note that the backup memory space 80 could also be placed at the top of the space 36 in global memory space 90.

The global memory space 90 is used by the application program at the block 12 to store critical variables, such as state variables, which may need to be accessed by any task in the execution cycle. The operation of the global memory space 90, as it relates to the stack-overflow/underflow recovery method disclosed herein, will also be explained further in the discussion of FIGS. 2A and 2B below.

FIG. 2A is a diagram of the memory space 36 illustrating fault-free behavior at task switch between Task 2 and Task 0. FIG. 2A illustrates the preemptive measures taken to provide protection against a stack overflow fault. Similar measures, not shown for the sake of clarity, can be taken (capturing memory from below a task's stack) to protect against stack underflow faults. Because Task 0 is the next task to be executed, it is desirable to make a backup copy of a portion of memory above the Task 0 stack segment 40, so that recovery will be possible in case Task 0 causes a stack overflow when it executes. Thus, before execution of Task 0, a segment 58 comprising M bytes of memory from the occupied Task 1 stack 52 is copied to backup memory segment 84 in the backup memory space 80. In one embodiment, the size M of the segments 58 and 84 is determined in advance of program execution, and remains fixed for all memory backup and restore operations. In another embodiment, the size M is established at an initial value and may grow if necessary during program execution, as will be discussed further below. Before execution of Task 0, it is also desirable to create a checkpoint copy of Task 0 state variables, in case they are needed for recovery later. Thus, Task 0 state variable data segments 92 and 94, representing state variables previously calculated by Task 0, are copied to Task 0 state storage location 82 in the backup memory space 80.

The backup memory space 80 is designed with a single backup memory segment 84, which is used to store a portion of memory from just above (for overflow) whatever task is about to commence. A second backup memory segment (not shown) would be used to store a portion of memory from just below (for underflow) whatever task is about to commence. However, the backup memory space 80 includes multiple state variable storage locations, one for each task, such as the Task 0 state storage location 82. In this example, the contents of the Task 0 state storage location 82 and the backup memory segment 84 can be used for recovery later, if the execution of Task 0 is subsequently found to cause a stack overflow. Before execution of Task 0 is commenced, a check is performed to determine if the last task which was executed, Task 2, caused a stack overflow. The Task 2 canary 66 is checked and determined to have the expected value, meaning no stack overflow occurred, so control can be returned to the application program at the block 12 for execution of Task 0.

FIG. 2B is a diagram of the memory space 36 illustrating recovery from a stack-overflow fault at a task switch between Task 2 and Task 0. Again, the same concept could be used for stack-underflow fault recovery, but only overflow is illustrated in FIG. 2B for clarity. In this case, when the Task 2 canary 66 is checked, it is determined to have been overwritten, meaning that a stack overflow occurred during the execution of Task 2. In traditional software systems, the stack overflow would cause a system crash or necessitate a system restart which, as discussed previously, would cause unacceptable downtime for real-time systems. However, using the recovery methodology disclosed herein, it is possible to avoid system crash or restart.

In FIG. 2B, because the Task 2 canary 66 is determined to be corrupt, execution of Task 0 does not commence. Instead, data from the backup memory space 80 must be copied back to appropriate locations in the memory space 36. One element of the recovery from the stack overflow is to re-populate state variable data from the previous checkpoint. Since execution of Task 2 is known to have been faulty, state variable data from a Task 2 state storage location 86 is copied back to a Task 2 state variable data segment 96 in the global memory space 90.

Also, the contents of the backup memory segment 84 must be copied back to the appropriate location in the memory space 36. Prior to the faulty execution of Task 2, the backup memory segment 84 would have been populated with M bytes of memory from the stack location immediately above the Task 2 stack segment 60, which is the O/S stack 72. Therefore, because part of the O/S stack 72 may have been overwritten in the stack overflow during Task 2 execution, the backup memory segment 84 must be copied back to segment 76 in the O/S stack 72. With state variable data and memory restored from the backup memory space 80, it is then possible to continue with the execution of Task 0.

Figure 3:
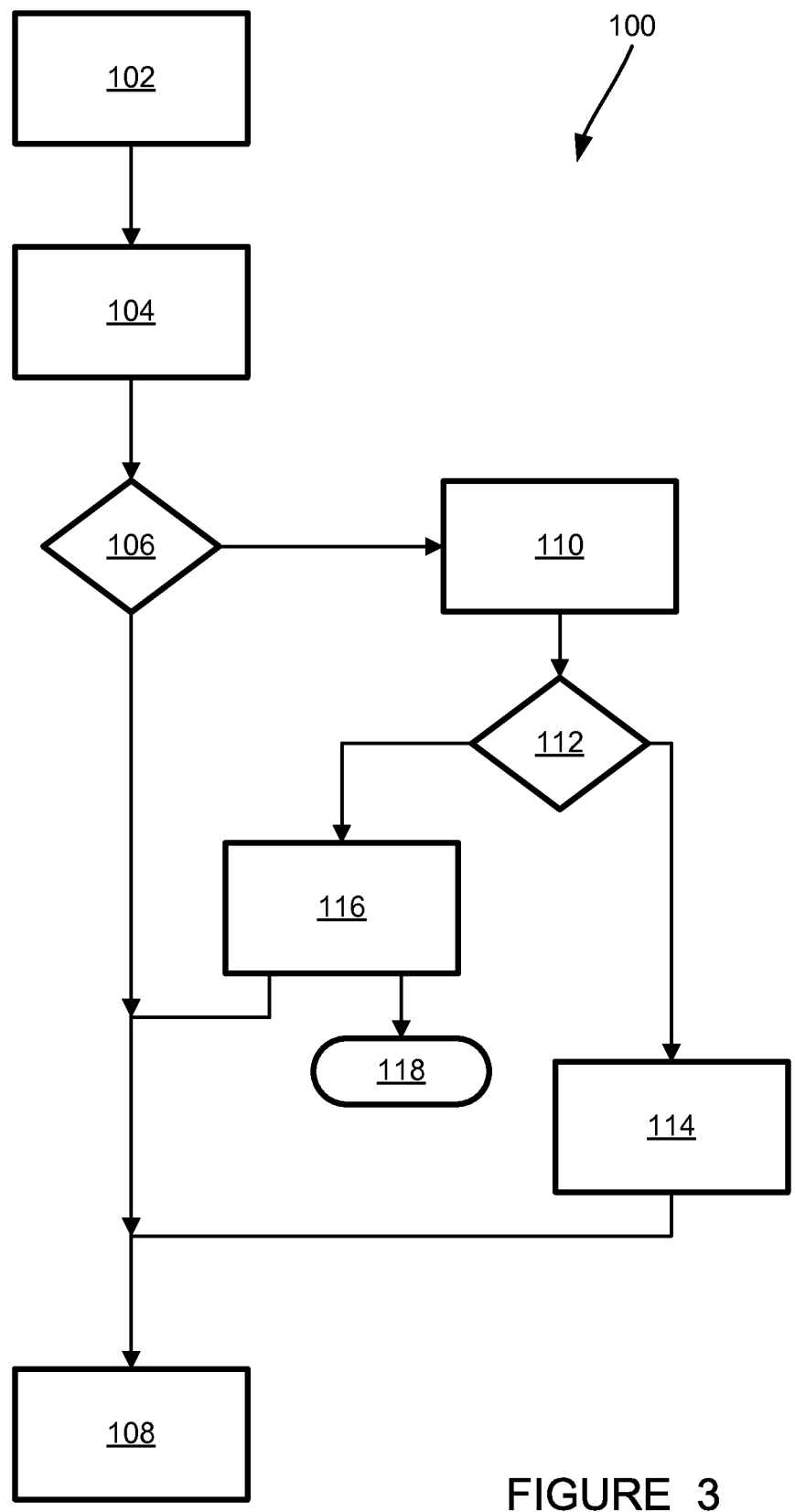
FIG. 3 is a flow chart diagram of a method for recovering from a stack-overflow/underflow fault without restarting software or hardware.

FIG. 3 is a flow chart diagram 100 of a method for recovering from a stack overflow without restarting software or hardware, using the memory and state variable backup copy techniques described above. Discussion of FIG. 3 as it relates to stack underflow detection and recovery follows below. Discussion of the flow chart diagram 100 includes references to elements of the memory space 36 of FIGS. 2, 2A and 2B. At box 102, an application program is ready to switch from a task $T_i$ to a task $T_d$. As discussed previously, the box 102 could also represent a switch from an interrupt service routine (ISR) to a task, or a switch from a task to an ISR. At box 104, state variable data for the task $T_d$ are stored in a segment of the backup memory space 80 which is designated for task $T_d$ state data. Also at the box 104, M bytes of memory from above the stack of the task $T_d$ are copied to a segment of the backup memory space 80 which is designated for memory copy, such as the backup memory segment 84.

At decision diamond 106, it is determined whether there was a stack overflow for the task $T_i$. If there was no stack overflow for the task $T_i$, then the process continues to box 108, where the task $T_d$ commences. If there was a stack overflow for the task $T_i$, then the process continues from the decision diamond 106 to box 110, where state data for the task $T_i$ are recovered. State data for the task $T_i$ can be recovered by directly copying from designated locations in the backup memory space 80 to the proper locations in the global memory space 90, as discussed previously. It is also possible to estimate a refined value of the state data for the task $T_i$ by applying an estimation algorithm $E_i$ to the state data for the task $T_i$ which is stored in the backup memory space 80. Estimation algorithms are discussed further below. Optionally, task $T_i$ parameter data can be stored at the box 110 to aid in fault diagnosis after the fact, where the task $T_i$ parameter data includes the value of i (indicating which task experienced a fault), the values of all inputs to the task $T_i$, and the state variable data for the task $T_i$.

Finally, before leaving the box 110, the task $T_i$ is terminated. At this point, after a stack overflow of the task $T_i$, the task $T_i$ has been terminated and state data for the task $T_i$ has been restored. It is then necessary to restore memory data from the backup memory space 80 to whatever portion of the memory space 36 may have been corrupted by the stack overflow. At decision diamond 112, it is determined whether the stack overflow from the task $T_i$ exceeds M bytes. This is done by checking whether the last word of the backup memory segment 84 is the same as that in the location to which it is to be restored. If the stack overflow from the task $T_i$ does not exceed M bytes, then at box 114 the backup memory segment 84 can be copied to the location to which it is to be restored, and then the task $T_d$ can be started at the box 108.

Figure 4:
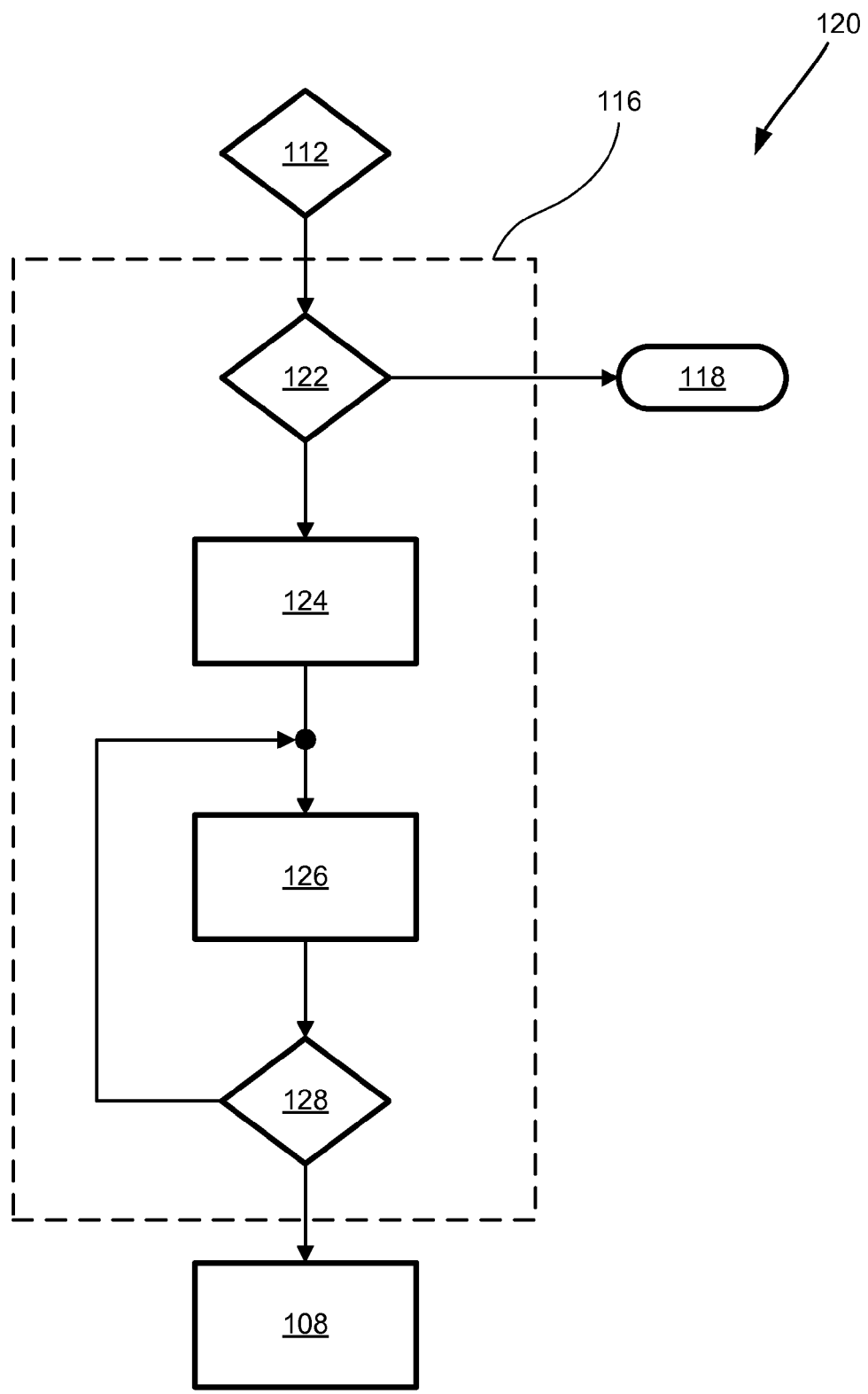
FIG. 4 is a flow chart diagram of a method for recovering from a stack-overflow/underflow fault in which the amount of overflow exceeds the amount of restorable memory data.

If, at the decision diamond 112, it is determined that the stack overflow from the task $T_i$ exceeds M bytes, then at box 116 an attempt is made to recover from the non-restorable stack overflow. If the attempt is successful, then the process continues to the box 108, where the task $T_d$ is started. If the attempt to recover from the non-restorable stack overflow is not successful at the box 116, then the process halts at terminus 118 and the application program has to be restarted. Details of the recovery from the non-restorable stack overflow process are shown in FIG. 4 and discussed below.

Inputs required for the method shown in the flow chart diagram 100 include a list of tasks, a set of next-state estimation algorithms, and a mapping of the backup memory space 80. For a number of tasks k in the application program, the list of tasks $\{T_0, T_1, \ldots, T_{k-1}\}$ must be provided in order of descending stack start address. Next-state estimation algorithms $(E_0, E_1, \ldots, E_{k-1})$ must be provided for each of the k tasks, where the algorithms are created in advance by a programmer of the application program and estimate the output of each of the tasks based on known data, such as state variable values from a previous cycle of execution. The other required input, the mapping of the backup memory space 80, must include the memory stack location of the backup memory segment 84 and the state storage locations for each of the k tasks.

The method of the flow chart diagram 100 in FIG. 3 can be used to detect and recover from stack underflow faults in additional to stack overflows. This can be done in one of two ways. Either a second complete set of steps can be performed for underflows (immediately after successful completion of the overflow check, for example), or the underflow checks can be incorporated directly into the method of the flow chart diagram 100 (by checking for either an overflow or an underflow at the decision diamond 106, and proceeding accordingly with recovery if either is detected).

The method of the flow chart diagram 100 can also be used to detect and recover from stack overflows/underflows at function-call returns, instead of at task switches. In this case, the box 102 would represent a function-call return instead of a task switch. The remainder of the method of the flow chart diagram 100 would be unchanged from the description above; a state data backup would be captured at the box 104, a stack-overflow/underflow condition would be checked for at the decision diamond 106, and recovery from a stack-overflow/underflow condition would be carried out at the box 110 and below. Buffer overflow check violations can also trigger the aforesaid operations.

FIG. 4 is a flow chart diagram 120 of a method for recovering from a stack overflow or underflow in which the amount of overflow or underflow exceeds the amount of restorable memory data. The flow chart diagram 120—which will be discussed first in the context of an overflow fault—illustrates what happens inside the box 116 which was introduced in the discussion of FIG. 3. As discussed above, at the box 116, an attempt is made to recover from a fault where the stack overflow from the task $T_i$ exceeds M bytes. In such a situation, the decision diamond 112 leads to the box 116. At decision diamond 122, it is determined whether the stack of the task $T_i$ overflowed beyond the stack segment of the last task, $T_{k-1}$. This can be determined by checking the canary value for the last task, $T_{k-1}$. If the stack of the task $T_i$ overflowed beyond the stack segment of the last task, $T_{k-1}$, this is a non-recoverable situation, and the process halts at the terminus 118, where the application program is restarted.

If the stack of the task $T_i$ did not overflow beyond the stack segment of the last task, $T_{k-1}$, then the process continues to box 124 where a counter p is given a value of 1. At box 126, the next state of task $T_{i+p}$ is estimated using estimation algorithm $E_{i+p}$ applied to state data for the task $T_{i+p}$ which is stored in the backup memory space 80. Then the task $T_{i+p}$ is terminated, and the counter p is incremented by 1. At decision diamond 128, it is determined whether the stack of the task $T_i$ overflowed beyond the stack segment of the task, $T_{i+p}$. If not, then recovery is complete, and the process continues to the box 108, where the task $T_d$ is started, as discussed previously.

If, at the decision diamond 128, it is determined that the stack of the task $T_i$ overflowed beyond the stack segment of the task, $T_{i+p}$, then the process loops back to the box 126, where the state of the next higher task number is estimated using its estimation algorithm, that task is terminated, and the counter is again incremented. The loop between the box 126 and the decision diamond 128 continues until the extent of the stack overflow has been determined, and next states have been estimated for all tasks which had stack data overwritten by the stack overflow. Then the process drops through to the box 108, where the task $T_d$, which was scheduled for execution next, is commenced.

It was mentioned previously that the size M of the backup memory segment 84 may be allowed to grow during program execution. This can be accomplished in flow chart diagram 120 as follows. Each time the process of the flow chart diagram 120 is executed, the value of M can be increased to the amount of memory that would have been needed to recover from the stack overflow (or underflow) which was just encountered. That is, the number of tasks which had their stack overflowed, as measured by the counter p, can be used to determine the future value of M.

In a manner similar to that discussed previously, the method of the flow chart diagram 120 can be applied to underflow faults as well as overflow faults. When applied to stack underflow faults, a determination is made whether the underflow amount from the task $T_i$ exceeds M bytes, and if so, by how much. This determination is made by recursively checking a canary value for the stack belonging to previous tasks until the extent of the underflow is identified. If the underflow extends beyond the stack origin of the first task $T_1$, then this is an unrecoverable situation and the application program would be restarted.

Prototype implementations have shown that the disclosed methods make stack-overflow/underflow fault recovery possible, while resource consumption overhead is minimal. Recovering from stack-overflow/underflow faults without restarting hardware or software can be very beneficial to embedded automotive systems, or any other system which cannot tolerate downtime interruptions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for recovering from stack-overflow or stack-underflow faults in a software application running on a processor, said method comprising:

configuring a physical memory space to include a stack memory and a backup memory location;

copying a portion of the stack memory and a set of state variables to the backup memory location upon a task switch in an application program;

determining whether a stack-overflow or stack-underflow fault occurred during execution of a previous task;

restoring a saved set of state variables for the previous task if the stack-overflow or stack-underflow fault occurred during execution of the previous task;

terminating the previous task if the stack-overflow or stack-underflow fault occurred during execution of the previous task;

restoring a saved portion of the stack memory if the stack-overflow or stack-underflow fault occurred during execution of the previous task; and commencing a next task.

2. The method of claim 1 wherein copying a portion of the stack memory to the backup memory location includes copying a stack memory segment above a stack canary for the next task and a stack memory segment below a stack canary for the next task to the backup memory location.

3. The method of claim 1 wherein copying a set of state variables to the backup memory location includes copying state variables for the next task to the backup memory location.

4. The method of claim 1 wherein determining whether a stack-overflow or stack-underflow fault occurred during execution of a previous task includes checking a canary value for the previous task.

5. The method of claim 1 wherein restoring a saved set of state variables for the previous task includes estimating a refined value of the saved set of variables using an estimation algorithm for the previous task.

6. The method of claim 1 wherein restoring a saved portion of stack memory includes determining whether an amount of stack overflow or stack underflow from the execution of the previous task exceeds a size of the saved portion of stack memory.

7. The method of claim 6 wherein restoring a saved portion of stack memory includes recursively estimating output and states of tasks with lower memory addresses in the stack memory, if the amount of stack overflow from the execution of the previous task exceeds the size of the saved portion of stack memory.

8. The method of claim 7 wherein, if the amount of stack overflow from the execution of the previous task exceeds the size of the saved portion of stack memory, the size of the saved portion of stack memory is increased for future execution of the software application.

9. The method of claim 6 wherein restoring a saved portion of stack memory includes recursively estimating output and states of tasks with higher memory addresses in the stack memory, if the amount of stack underflow from the execution of the previous task exceeds the size of the saved portion of stack memory.

10. The method of claim 1 further comprising storing parameter data for the previous task if the stack-overflow or stack-underflow fault occurred during execution of the previous task.

11. The method of claim 10 wherein the parameter data includes an identification number for the previous task, input data for the previous task, and state variables for the previous task.

12. A method for recovering from stack-overflow or stack-underflow faults in a software application running on a microcontroller in a vehicle, said method comprising:
copying a portion of stack memory and a set of state variables for a next task to a backup memory location upon a task switch in an application program, where the stack memory and the backup memory location are part of a physical memory space;
determining whether a stack-overflow or stack-underflow fault occurred during execution of a previous task;
storing parameter data for the previous task if the stack-overflow or stack-underflow fault occurred during execution of the previous task, where the parameter data includes an identification number for the previous task, input data for the previous task, and state variables for the previous task;
restoring a saved set of state variables for the previous task if the stack-overflow or stack-underflow fault occurred during execution of the previous task;
terminating the previous task if the stack-overflow or stack-underflow fault occurred during execution of the previous task;
restoring a saved portion of stack memory if the stack-overflow or stack-underflow fault occurred during execution of the previous task; and
commencing a next task.

13. The method of claim 12 wherein determining whether a stack-overflow or stack-underflow fault occurred during execution of a previous task includes checking a canary value for the previous task.

14. The method of claim 12 wherein restoring a saved set of state variables for the previous task includes estimating a refined value of the saved set of variables using an estimation algorithm for the previous task.

15. A stack-overflow or stack-underflow fault recovery system, said system comprising:
an application program for executing a plurality of tasks;
a task-switch checkpoint module which, upon a task switch in the application program, makes backup copies of state data and memory data;
a data backup module for storing the backup copies of state data and memory data;
a fault detection module for detecting a stack overflow or stack underflow condition;
a data corruption identification module for identifying corrupted state data and a corrupted memory region if the stack overflow or stack underflow condition is detected by the fault detection module;
a memory restoration module for repairing the corrupted memory region using the backup copy of memory data from the data backup module if the stack overflow or stack underflow condition is detected by the fault detection module;
a state data restoration module for repairing the corrupted state data using the backup copy of state data from the data backup module if the stack overflow or stack underflow condition is detected by the fault detection module; and
a processor configured to run the application program, the task-switch checkpoint module, the data backup module, the fault detection module, the data corruption identification module, the memory restoration module, and the state data restoration module.

16. The system of claim 15 wherein the task-switch checkpoint module makes the backup copies of state data and memory data for a next task when a previous task has completed fault-free execution.

17. The system of claim 15 wherein the fault detection module uses one or more canary values to detect the stack overflow or stack underflow condition.

18. The system of claim 15 wherein the data backup module stores the backup copies of state data and memory data in a memory stack location which cannot be overwritten during the stack overflow or stack underflow condition.

19. The system of claim 15 wherein the state data restoration module uses an estimation algorithm to estimate new values for the corrupted state data using the backup copy of state data as input.

20. The system of claim 15 wherein the stack-overflow or stack-underflow fault recovery system is part of a control system in an automobile.

* * * * *